United States Patent Office 3,049,517
Patented Aug. 14, 1962

3,049,517
COPOLYMERISATION OF TRIALLYL CYANURATE AND METHYL METHACRYLATE
John Antony Caton, Wheathampstead, England, assignor to Imperial Chemical Industries Limited, London, England, a corporation of Great Britain
No Drawing. Filed June 12, 1959, Ser. No. 819,832
Claims priority, application Great Britain June 27, 1958
5 Claims. (Cl. 260—77.5)

This invention relates to improvements in or relating to the polymerisation of unsaturated organic compounds, particularly to the production of polymeric methyl methacrylate.

Methyl methacrylate can be polymerised to form a hard transparent material which has many useful applications. In particular, the polymer can be made in the form of flat sheets which because of the thermoplastic nature of the polymer can be shaped to produce articles of many different forms. Because of this thermoplastic property, articles of polymethyl methacrylate lack dimensional stability at temperatures approaching the softening point of the polymer and consequently there are some uses for which polymethyl methacrylate is unsuitable. It is known that methyl methacrylate can be copolymerised with certain monomeric materials containing more than one ethylene double bond per molecule e.g. allyl methacrylate, to give a material that remains rigid when heated to temperatures at which polymethyl methacrylate normally softens. Such copolymers have the disadvantage that when they are made in the form of flat sheets, the sheets cannot easily be shaped.

It is an object therefore of the present invention to provide a process for the polymerisation of methyl methacrylate to give polymeric material that is solid and rigid at ordinary temperatures and which can be shaped at elevated temperatures to give a material of improved mechanical stability at high temperatures.

According to the present invention I provide a process that comprises polymerising a mixture of monomers consisting essentially of methyl methacrylate and triallyl cyanurate and containing from 5 to 50% by weight of triallyl cyanurate based on the combined weights of the methyl methacrylate and triallyl cyanurate in the presence of catalytic amounts of at least two different organic polymerisation catalysts at least one but not all said catalysts being catalytically effective within the temperature range of 30 to 100° C. and being present in sufficient concentration to cause polymerisation to proceed at a faster rate within said temperature range of 30 to 100° C. than if said catalysts were absent, and the other or the rest of said catalysts having a high degree of catalytic effectiveness within the temperature range of 140 to 180° C. but being not substantially catalytically effective at temperatures below 100° C., and being present in sufficient concentration to cause polymerisation to proceed at a faster rate within said temperature range of 140 to 180° C. than if no catalyst were present, and heating said mixture of monomers within the range of 30 to 100° C. for a time sufficient to convert the mixture to solid rigid polymeric material. Further according to the present invention I provide a process for providing a solid polymeric material having improved mechanical stability at high temperatures that comprises maintaining said solid rigid polymeric material at a temperature of from 140° C. to 180° C.

My process makes it possible to obtain polymeric material that can if desired be transparent or opaque, coloured or colourless, that is rigid at ordinary temperatures and is initially thermoplastic, but which upon heating at the shaping or moulding temperatures acquires improved mechanical stability at high temperatures.

Organic catalysts that are effective at temperatures from 30 to 100° C. include benzoyl peroxide, acetyl peroxide, lauryl peroxide, and the azo polymerisation catalysts in which the valences of the azo group are attached to different nonamomatic, preferably tertiary, carbon atoms, e.g. alpha,alpha'-azodiisobutyronitrile. These catalysts are referred to hereinafter as the low temperature catalysts.

An example of an organic catalyst that is effective at temperatures from 140 to 180° C., referred to hereinafter as high temperature catalysts, is di-tert butyl peroxide. This compound is particularly stable at temperatures below 100° C. and is therefore preferred. It will be appreciated that the high temperature catalyst may have some catalytic effect below 100° C., and it is desirable that this should be very slight compared with the effect of the low temperature catalyst at those temperatures in order to derive the maximum benefit from our invention. Examples of other catalysts that may be used as high temperature catalysts include tertiary butyl peracetate, tertiary butyl perbenzoate and tertiary butyl hydroperoxide.

My process is most usefully carried out by polymerising the mixture of methyl methacrylate and triallyl cyanurate in the form of a liquid layer between two glass sheets capable of relative movement towards each other, as for example, disclosed in British Patent No. 450,305. The glass cell containing the monomeric mixture is then heated to from 30° C. to 100° C. for a time sufficient to convert the material to a rigid sheet. At the end of this time the glass sheets are stripped from the sheet of polymer which is hard and can be cut or sawn but which is still thermoplastic. The polymerisation process is exothermic and unless careful control of the temperature is exercised, bubbles may be formed in the sheet. To avoid bubble formation sufficient low temperature catalyst is used to enable the process to proceed at from 30 to 100° C. and at a speed that prevents any excessive rise in temperature caused by the liberation of heat. With benzoyl peroxide from 0.01% to 1% by weight of the catalyst based on the total weight of methyl methacrylate and triallyl cyanurate is usually employed, and with this concentration of catalyst the time taken to produce hard rigid polymeric material is normally from 6 to 24 hours.

If desired, the polymerisable material used in the first part of my process can be converted to a syrup before introduction to the glass cell. The use of a syrup has the advantage that the tendency for leakage from the cell is reduced. The syrup is most conveniently prepared by first partially polymerising the methyl methacrylate containing the low temperature catalyst until a syrup containing from about 5 to 15% of polymethyl methacrylate has been formed, and then adding the remaining ingredients. Alternatively the syrup can be prepared by dissolving the required amount of polymethyl methacrylate in methyl methacrylate.

The thermoplastic sheet can be converted to its final improved form by heating to from 140 to 180° C. for about 30 to 90 minutes. Where the sheet is to be shaped or moulded at least part of this heating step can form part of the shaping or moulding process. The amount of high temperature catalyst used in my process is preferably from 0.1 to 2.5% by weight based on the weight of the mixture of methyl methacrylate and triallyl cyanurate. Increasing the concentration of the high temperature catalyst increases the rate at which the thermoplastic material is converted to the heat stable condition at a particular temperature within the range of 140 to 180° C.

By varying the proportion of triallyl cyanurate in the monomer mixture within the range hereinbefore described, the final properties of the thermoplastic material can be controlled. Thus by increasing the proportion of triallyl cyanurate in the monomer mixture, the mechanical stability of the final product at high temperatures can be increased. The most useful concentrations of triallyl cyanurate to use are from 15 to 25% by weight of the mixture with methyl methacrylate. Such mixtures when polymerised to the thermoplastic stage are easily shaped and can be cured fairly rapidly e.g. within about one hour.

Other known ancillary ingredients can be added to the polymerisation mixture e.g. colouring materials and stabilisers.

My invention is illustrated, but in no way limited, by the following example in which all parts are expressed by weight.

80 parts of methyl methacrylate containing 0.0025 part of alpha, alpha'-azodiisobutyronitrile were heated for 1½ hours at 85 to 90° C. to form a syrup containing about 6 parts of polymethyl methacrylate. After cooling, the following ingredients were dissolved in the syrup:

20 parts of triallyl cyanurate
0.1 part of benzoyl peroxide
1.0 part of ditertiary butyl peroxide The syrup was transferred to a cell formed from two glass plates separated by a flexible gasket round the periphery of the cell. The cell was maintained at 50° C. for 10 to 12 hours followed by heating for half an hour at 98° C. The sheet of polymer was separated from the glass plates. It was quite rigid at ordinary temperatures and could be handled and stored without suffering any deformation.

The sheet was then softened by heating at 100–120° C. for 5 minutes and was then shaped in a mould and maintained at 165° C. for 60 to 90 minutes. The final shaped product was rigid and demoulded only very slightly when heated unsupported at 165° C. for one hour. At ordinary temperatures it was found to swell slightly in organic solvents such as chloroform, but was not dissolved by them.

Similar results were obtained when the example was repeated using acetyl peroxide, lauryl peroxide, and αα'-azodiisobutyronitrile respectively in place of benzoyl peroxide, and by using tertiary butyl peracetate, tertiary butyl perbenzoate and tertiary butyl hydroperoxide respectively in place of di-tertiary butyl peroxide.

I claim:
1. A process for the production of thermoplastic solid materials which are rigid at ordinary temperatures and capable of being handled and stored without suffering deformation and for the curing of said materials, which process comprises heating a mixture of monomers consisting essentially of methyl methacrylate and triallyl cyanurate and containing from 15–25% by weight of triallyl cyanurate based on the combined weights of the methyl methacrylate and triallyl cyanurate, in the presence of catalytic amounts of at least two different organic free radical polymerization catalysts, at least one but not all said catalysts being catalytically effective within the temperature range of 30 to 100° C. and being present in sufficient concentration to cause polymerization to proceed at a faster rate within said temperature range of 30 to 100° C. than if said catalyst were absent, and the other or the rest of said catalysts having a high degree of catalytic effectiveness within the temperature range of 140 to 180° C. but being not substantially catalytically effective at temperatures below 100° C. and being present in sufficient concentration to cause polymerization to proceed at a faster rate within said temperature range of 140 to 180° C. than if no catalyst were present, said mixture of monomers being heated within the range of 30 to 100° C. for a time sufficient to convert the mixture to solid rigid polymeric material, shaping the polymeric material and curing the polymeric material by heating it to a temperature of 140–180° C. for about 30–90 minutes to increase mechanical stability at elevated temperatures.

2. A process according to claim 1 in which the catalyst catalytically active within the temperature range of 30 to 100° C. is at least one selected from benzoyl peroxide, acetyl peroxide, lauryl peroxide and the azo compounds in which the valencies of the azo group are attached to non-aromatic carbon atoms.

3. A process according to claim 2 in which said catalyst is benzoyl peroxide in concentration of from 0.01 to 1% by weight of the mixture of methyl methacrylate and triallyl cyanurate.

4. A process according to claim 3 in which said catalyst having a high degree of catalytic effectiveness at from 140 to 180° C. is one selected from di-tertiary butyl peroxide, tertiary butyl peracetate, tertiary butyl perbenzoate and tertiary butyl hydroperoxide.

5. A process according to claim 4 in which said catalyst is used in concentrations of from 0.1 to 2.5% by weight of the mixture of methyl methacrylate and triallyl cyanurate.

References Cited in the file of this patent

UNITED STATES PATENTS

| | | |
|---|---|---|
| 2,433,616 | Marple et al. | Dec. 30, 1947 |
| 2,444,655 | Kroeker et al. | July 6, 1948 |
| 2,510,503 | Kropa | June 6, 1950 |
| 2,534,120 | Glick | Dec. 12, 1950 |
| 2,632,758 | Brothman | Mar. 24, 1953 |
| 2,656,334 | D'Alelio | Oct. 20, 1953 |
| 2,910,456 | De Gooreynd et al. | Oct. 27, 1959 |